ବ2,925,397
Patented Feb. 16, 1960

2,925,397

POLYMER COMPOSITION COMPRISING A RESINOUS POLYMER AND THE SALT OBTAINED BY REACTING A QUATERNARY AMMONIUM COMPOUND WITH AN ANIONIC SURFACE ACTIVE COMPOUND AND METHOD OF MAKING SAME

Konrad Höpfner and Willy Offermann, Dusseldorf, Germany, assignors to Dehydag, Deutsche Hydrierwerke G.m.b.H., Dusseldorf, Germany, a corporation of Germany No Drawing. Application April 22, 1955
Serial No. 503,353

4 Claims. (Cl. 260—30.6)

This invention relates to new and valuable plastic compositions and more particularly to plastic compositions comprising high polymer, non-rubber plastic material, and to a process of compounding such plastic material.

It is one object of the present invention to considerably facilitate working and compounding of high polymer non-rubber plastic materials with solid, pulverulent additives, such as fillers, loading agents, pigments, and the like and to readily, homogeneously, and intimately incorporate such additives into and evenly distribute the same throughout said high polymer non-rubber plastics.

Another object of the present invention is to provide new and valuable plastic compositions of considerably improved mechanical strength properties.

Other objects of the present invention and advantageous features thereof will become apparent as the description proceeds.

In principle, the process according to the present invention for working up and compounding high polymer compositions is characterized by the incorporation into said plastic compositions of organic electro-neutral salts as they are obtained by reacting equimolecular amounts of anionic surface-active and cationic surface-active compounds.

High polymer non-rubber plastic materials as they are employed according to the present invention are, for example, the well known polyvinyl compounds such as polyvinyl chloride, polyvinyl acetate, polyacrylic acid compounds, such as polyacrylonitrile, polyacrylic acid esters, polymethacrylic acid esters, polystyrenes, polyamides, such as the polyamides from hexamethylene diamine and adipic acid, polyesters, such as phthalic acid glycerides, cellulose derivatives, such as cellulose nitrates, cellulose acetates, cellulose acetate butyrates, and the like. However, rubber compounds such as natural rubber, various types of synthetic rubber, or reclaimed rubber are excluded from this application but are included in application Serial No. 435,358, filed June 8, 1954.

As a result of the addition of such organic electro-neutral salts, working up and compounding of said high polymer non-rubber plastics is considerably facilitated. More particularly incorporation of solid pulverulent additives, such as fillers, loading agents, pigments and the like, is considerably improved since said additives are rapidly wetted with and are very intimately and homogeneously distributed throughout said plastics.

Furthermore, said electro-neutral salts as such or in combination with known plasticizers and gelatinizing agents or plasticizer-diluting agents produce a remarkable plasticizing and swelling effect and considerably improve the mechanical strength properties of the resulting final products.

Known additives such as, for instance, inorganic oxides, hydroxides, or salts, finely dispersed silica, talc, kaolin, or other pulverulent compounds can also be added to impart specific and characteristic properties to the resulting compositions. The resulting compositions are further worked up in the conventional manner and can be converted, for instance, into filaments, films, foils, sheets, blocks, or otherwise shaped products.

For producing organic electroneutral salts for the purpose of the present invention, known cationic surface-active onium compounds are used, such as, for instance, organic ammonium, sulfonium, phosphonium, and the like compounds. Said onium compounds, preferably, contain at least one aliphatic, cycloaliphatic, aliphatic-aromatic, or cycloaliphatic-aromatic residue with at least 6 carbon atoms. Said residue may contain up to 20 and even more carbon atoms. The hydrocarbon radicals of said compounds may also contain hetero atoms, or groups of hetero atoms, or suitable substitutents.

The known organic ammonium compounds derived from ammonia or from organic nitrogen bases are of particular practical interest. Such compounds are, for instance, trimethyl octyl ammonium chloride, trimethyl dodecyl ammonium chloride, trimethyl octadecyl ammonium methosulfate, dimethyl dioctadecyl ammonium chloride, dimethyl dodecyl benzyl ammonium chloride, dimethyl cyclohexyl alkyl ammonium chlorides with 10 to 22 carbon atoms in their alkyl radical, or mixtures of such compounds, dodecyl pyridinium chloride, hexadecyl pyridinium bisulfate, and the like. As stated above, the alkyl radicals in said ammonium compounds may also contain hetero atoms such as oxygen, sulfur, or nitrogen, or groups of hetero atoms derived therefrom, or suitable substitutents.

Anionic surface-active compounds which can be used as the other reaction component in the production of the required organic electro-neutral salts, are, preferably, known compounds of the aliphatic, cycloaliphatic, aliphatic-aromatic, or cycloaliphatic-aromatic series which have in their molecule at least one residue with at least six carbon atoms and up to twenty and even more carbon atoms and at least one acid, salt-forming group, wherein said acid, salt-forming group is neutralized by an inorganic or organic base capable of forming a water soluble salt with said compound. Compounds of this type are, for instance, alkyl sulfates, alkyl sulfonates, alkyl benzene sulfonates, salts of sulfonated oils and fats, salts of dialkyl or di-alkyl-aryl-disulfonic acid imides, or of dialkyl or di-alkyl-aryl-sulfonic carboxylic acid imides, salts of fatty acids or of resin acids, salts of condensation products of higher molecular carboxylic acid halogenides or of higher molecular sulfonic acid halogenides with proteins and the like. The hydrocarbon radicals of said compounds can also be interrupted by hetero atoms, such as oxygen, sulfur, or nitrogen, or by groups of hetero atoms, such as, for instance, ester, carboxylic acid amide, or sulfonic acid amide groups and the like. Said radicals may also contain suitable substituents such as hydroxyl, mercapto, amino groups or the like.

Other anionic surface-active compounds which may be employed as the other reaction component in the production of the required electro-neutral salts are, for instance, water soluble salts of higher molecular fatty acids with at least six carbon atoms, wax acids, naphthenic acids, resin acids, octyloxy acetic acid, hexadecyl mercapto acetic acid, C-alkyl cresoxy acetic acid, salts of compounds containing inorganic acid groups, such as dodecyl sulfuric acid ester, the sulfuric acid ester mixture of a mixture of aliphatic alcohols obtained by catalytic reduction of coconut oil, oleyl sulfuric acid ester, the sulfuric acid ester of ethylene glycol monooctyl ether, the mono- or disulfuric acid ester of glycerol monostearic acid ester, the phosphoric acid ester of decanediol monoacetate, the ω-butyl ether of decyl sulfuric acid ester, the ω-hexyl thioether of octyl thiosulfuric acid ester, N-butyl-N-doecyl sulfamic acid, the sulfuric acid ester of β-hydroxy-γ-(secondary octyl cresoxy) propane, secondary octyl phenoxy ethane sulfuric acid ester, N-oleoyl-N-methyl amino ethane-β-sulfonic acid, stearoyloxy ethane-β-sulfonic acid, N-cetyl sulfonic sulfanilic acid, the ω-cyclohexyl ether of decane sulfonic acid, secondary octyl phenyl benzyl ether-4′-sulfonic acid, salts of alkyl benzene sulfonic acids the alkyl thereof having between about six and about 18 carbon atoms, of the mixture of isomeric 2-isoalkyl cresoxy benzoic acid sulfonic acids-5, the alkyl radical thereof having 5 to 11 carbon atoms, of 1-secondary octyl phenoxy benzene-2,5-disulfonic acid, of 1-secondary hexyl phenoxy-2-(acetyl amino) benzene-4-sulfonic acid, of the sulfonation product of the secondary octyl-1-cresyl benzyl ether, of the sulfonation product of cresoxy acetic acid dodecylamide, and others.

The electro-neutral salts used according to the present invention are prepared from said starting materials for instance, by mixing equimolecular amounts of an aqueous solution of the anionic surface-active component with an aqueous solution of the cationic surface-active component whereby the electro-neutral salt precipitates. It is understood, of course, that the hydrocarbon radicals of both components may be alike or different from each other. The resulting precipitated products can directly be used for the purpose of this invention or they are first purified, freed from their salt content, and dried. Under certain conditions it is possible to use, in place of said electro-neutral salts, equimolecular amounts of their starting components.

Said organic electro-neutral salts can be incorporated as such into the plastic composition or in the form of their aqueous solutions or dispersions, or in form of solutions in organic solvents. The amounts to be incorporated vary according to the purpose for which said plastic compositions are employed and are between about 0.2% and about 30.0% and even more, calculated for the amount of polymer present in said plastic composition. Ordinarily, amounts between about 3% and about 20% yield fully satisfactory results.

The following examples serve to illustrate the present invention without, however, limiting the same thereto.

*Example I*

90 parts by weight of a mixed polymerization product of vinyl chloride and vinyl acetate are compounded, by means of heated rollers, with 15 parts by weight of an organic electro-neutral salt prepared by reacting equivalent amounts of dimethyl octyl cyclohexyl ammonium chloride and the sodium salt of capric acid ($C_9H_{19}COONa$), and with 30 parts by weight of the penta-erythritol ester of the first runnings of fatty acids having 4 to 6 carbon atoms. The resulting composition is calendered into foils of excellent elasticity and cold resistance.

*Example II*

75 parts by weight of a polyamide made from hexamethylene diamine and adipic acid are melted and are mixed in said molten state with 20 parts by weight of the organic electro-neutral salt prepared by reacting equimolecular amounts of tri-methyl octyl ammonium chloride and the sodium salt of capric acid. The molten composition, on extruding through nozzles, yields clear, elastic foils.

In a similar manner other organic electro-neutral salts as they are obtained by reacting equimolecular amounts of cationic surface-active compounds and anionic surface-active compounds, such as named hereinbefore, can be incorporated into and compounded with high polymer non-rubber plastic materials. In place of heated rollers, and especially where dispersion of pigments and the like is not necessary, heavy kneaders may be used. Ball mills also find a large scale application, for instance, when incorporating pigments in plastic compositions of such polymer non-rubber plastic materials.

Various other methods of preparing said organic electro-neutral salts are described in said co-pending application Serial No. 435,358, filed June 8, 1954, and salts prepared according to said application may also be used according to the principles of this invention, also various modifications and changes may be made from the embodiments described herein within the principles of this invention and the scope of the following claims.

We claim:

1. A solid high polymer plastic composition in which additives can be easily and intimately dispersed which plastic composition consists essentially of a plastic selected from the group consisting of polyvinyl halides, polyvinyl acetate, polyacrylonitrile, polystyrene, polyamide of hexamethylene diamine and adipic acid and polyester of glycerol and phthalic acid having incorporated therein and intimately and thoroughly dispersed therethrough a water-insoluble organic salt precipitate obtained by adding together an aqueous solution of organic cationic surface-active quaternary ammonium compounds having at least one alphatic hydrocarbon radical containing 6 to 22 carbon atoms and an aqueous solution of an organic anionic surface-active compound having at least one aliphatic hydrocarbon radical containing 6 to 20 carbon atoms and at least one acid radical capable of being neutralized by an organic base to form a salt therewith selected from the group consisting of sulfuric acid radicals, sulfonic acid radicals, phosphoric acid radicals and carboxylic acid radicals, said cationic and said anionic compounds being in substantially equimolar proportions in said precipitate, in an amount between about 3% and about 20% of the amount of said plastic present in said solid high polymer plastic composition.

2. A solid high polymer plastic composition in which additives can be easily and intimately dispersed which consists essentially of a polyamide of hexamethylene diamine and adipic acid having incorporated therein and intimately and thoroughly dispersed therethrough a water-insoluble organic salt precipitate obtained by reacting equimolecular amounts of an aqueous solution of a tri-lower-alkyl-mono-higher-alkyl ammonium halide with an aqueous solution of an alkali metal salt of a fatty acid containing 6 to 20 carbon atoms in an amount between about 3% and about 20% of the amount of said polyamide.

3. A method of producing a high polymer plastic composition into which additives can be easily and intimately dispersed which consists in mechanically mixing a solid plastic selected from the group consisting of polyvinyl halides, polyvinyl acetate, polyacrylonitrile, polystyrene, polyamide of hexamethylene diamine and adipic acid and polyesters of glycerol and phthalic acid with from about 3 to about 20% based on the weight of the solid plastic of a water-insoluble organic salt precipitate obtained by adding together an aqueous solution of organic cationic surface-active quaternary ammonium compounds having at least one aliphatic hydrocarbon radical containing 6 to 22 carbon atoms and an aqueous solution of an organic anionic surface-active compound having at least one aliphatic hydrocarbon radical containing 6 to 20 carbon atoms and at least one acid radical capable of being neutralized by an organic base to form a salt therewith selected from the group consisting of sulfuric acid radicals, sulfonic acid radicals, phosphoric acid radicals and carboxylic acid radicals, said cationic and said anionic compounds being in substantially equimolar proportions in said precipitate, for a time sufficient to intimately and thoroughly disperse said organic salt precipitate throughout said plastic composition.

4. A solid high polymer plastic composition in which additives can be easily and intimately dispersed which consists essentially of a mixed polymerization product of vinyl chloride and vinyl acetate having incorporated therein and intimately and thoroughly dispersed therethrough a water-insoluble organic salt precipitate obtained by reacting equimolecular amounts of an aqueous solution of dimethyl-octyl-cyclohexyl ammonium chloride with an aqueous solution of the sodium salt of a capric acid in an amount of 16.7% of the amount of said polyamide.

References Cited in the file of this patent
UNITED STATES PATENTS

| | | |
|---|---|---|
| 2,276,305 | Hershberger | Mar. 17, 1942 |
| 2,313,154 | Kelly et al. | Mar. 9, 1943 |
| 2,360,990 | Van Valkenburgh | Oct. 24, 1944 |
| 2,373,173 | Dean | Apr. 10, 1945 |
| 2,413,197 | Smith et al. | Dec. 24, 1946 |